Oct. 28, 1958     H. SCHNEPEL     2,857,896

POPPET VALVE OPERATING MECHANISM

Filed June 24, 1957

INVENTOR
Herbert Schnepel
JUNE 21-1957

United States Patent Office 2,857,896
Patented Oct. 28, 1958

2,857,896

POPPET VALVE OPERATING MECHANISM

Herbert Schnepel, Indianapolis, Ind.

Application June 24, 1957, Serial No. 667,361

1 Claim. (Cl. 123—90)

The purpose of this invention is to facilitate the positive closing of the valve without the usual valve spring and washers required on the present valves in use up to this time. Another purpose is to increase the operating speed possible, whereas now the speed is controlled by the spring used to close the valve, this device will positively close the valve at higher operating speeds. Another purpose is compactness of design.

Figure 2:
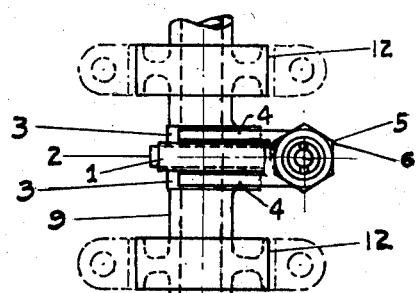
Figure 1:
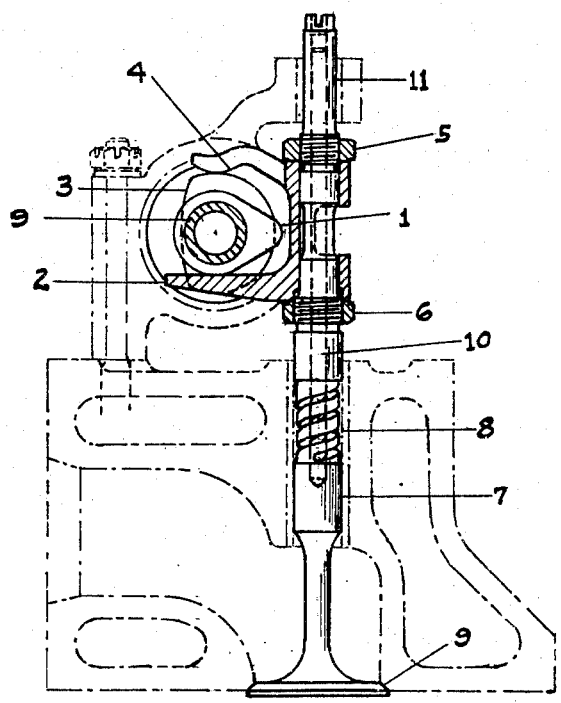
Figure 3:
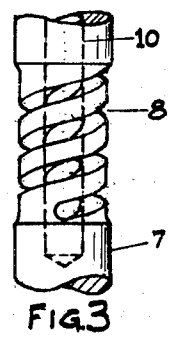

In description of the accompanying drawing Fig. 1 shows a typical installation in a cylinder head of an internal combustion engine. Dot and dash lines indicate a cylinder head for orientation only. The valve is shown in closed position but persons familiar with the art can easily see that when the camshaft 9 is rotated cam 1 will open the valve when the follower 2 is in contact with the toe of the cam and on further rotation cam 3 in conjunction with follower 4 will again close the valve. Cams 1 and 3 may be of a shape to give the required timing needs of the installation and the followers 2 and 4 may be either flat or curved. In Fig. 1 parts numbered 5 and 6 are lock nuts locking the follower direct to the valve stem 7. 8 is a helical groove or grooves which in conjunction with hole 10 form an integral spring to take care of expansion when temperatures change. Fig. 3 shows an enlargement of this detail. This spring must be proportioned properly to keep excessive loads from other parts when temperatures change. 9 is the valve seat of a normal poppet valve such as is now in use. 11 is a sliding bearing which will be found necessary in most cases but would not be required in all cases. Support for this bearing 11 is attached to the cylinder head or other device where this valve mechanism is used and its use depends on the loads imposed by the operating forces. 12 in Fig. 2 is a camshaft bearing or bearings and could be made in various ways as the application requires.

The proposed method of adjusting this valve is to turn the camshaft to valve closed position and tighten nut 5 finger tight first, while engine or other device is at room temperature, then tightening a predetermined amount to give the required preload so that valve will close when operating temperatures are attained. After this tighten nut 6 to lock cam followers 2 and 4 which are one piece to the valve stem 7.

I claim:

In a poppet valve operating mechanism, the combination of a valve, actuating cams, and a positive-actuating cam follower, said cam follower being adjustable relative to said cams and said valve, said actuating cams comprising separate means for opening and closing said valve, said valve comprising a stem having a helical groove extending longitudinally and circumferentially about said stem, an axially extending bore communicating with said helical groove, said communication between said bore and said groove providing for expansion and contraction of the valve to insure proper seating of the valve during operation thereof.

References Cited in the file of this patent

UNITED STATES PATENTS

| 1,409,110 | Hinton | Mar. 7, 1922 |
| 1,516,310 | Ryan | Nov. 18, 1924 |
| 1,692,435 | Clemensen | Nov. 20, 1928 |
| 1,696,361 | Reich | Dec. 25, 1928 |
| 2,751,895 | Gassman | June 26, 1956 |